Sept. 1, 1942.  R. B. SMITH  2,294,809
METHOD OF AND APPARATUS FOR THE REMOTE VERIFICATION OF CHECKS
Filed March 24, 1941  2 Sheets-Sheet 1

INVENTOR:
Ronald B. Smith,
BY
M H Swenarton,
His ATTORNEY.

Sept. 1, 1942. R. B. SMITH 2,294,809
METHOD OF AND APPARATUS FOR THE REMOTE VERIFICATION OF CHECKS
Filed March 24, 1941 2 Sheets-Sheet 2

INVENTOR:
Ronald B. Smith,
BY
His ATTORNEY.

Patented Sept. 1, 1942

2,294,809

UNITED STATES PATENT OFFICE 2,294,809

METHOD OF AND APPARATUS FOR THE REMOTE VERIFICATION OF CHECKS

Ronald B. Smith, East Orange, N. J.

Application March 24, 1941, Serial No. 385,025

8 Claims. (Cl. 178—6.7)

This invention relates to the positive verification of checks by a person at a location remote therefrom and has for its principal objects the provision of a simple, convenient and effective method for accomplishing such objects as well as an economical, compact, sturdy and efficient apparatus wherein such method can be accomplished. Other objects of the invention are hereinafter set forth.

Heretofore, as I am well aware, it has been proposed as disclosed in Patent No. 2,122,918, to reproduce a document that is in one location as a visible image at a second location distant therefrom through television means and to associate therewith telautograph means whereby signatures, corrections or the like applied to the visible image are caused to appear at the proper corresponding places on the original document. However, such a communication or check system not only requires the employment of expensive telautograph equipment together with the television mechanism, but also necessitates the direct application of words or characters to the original document to be checked with the consequent mutilation thereof to that extent and such direct application of characters or words to such document may often be highly objectionable. Furthermore, particularly in the case of checks which are often merely in transit through a bank, there is no permanent record made which can be retained by the bank to definitely show the nature of the report on such document that was made by the member of the bank staff to whom the visible image of the check in such second location has been submitted.

My investigations have led to the discovery of a unique method and apparatus for the remote verification of checks, whereby not only it is possible without defacement or mutilation of the check, for a bookkeeper or other individual in charge of the depositors' accounts in a bank to expeditiously investigate and report on a check of a depositor which is presented for payment to the teller stationed remote from the bookkeeping department but also to automatically photographically record an image constituting such check with selected words or symbols, characteristic of the report so made, imposed on or associated therewith.

Figure 1:
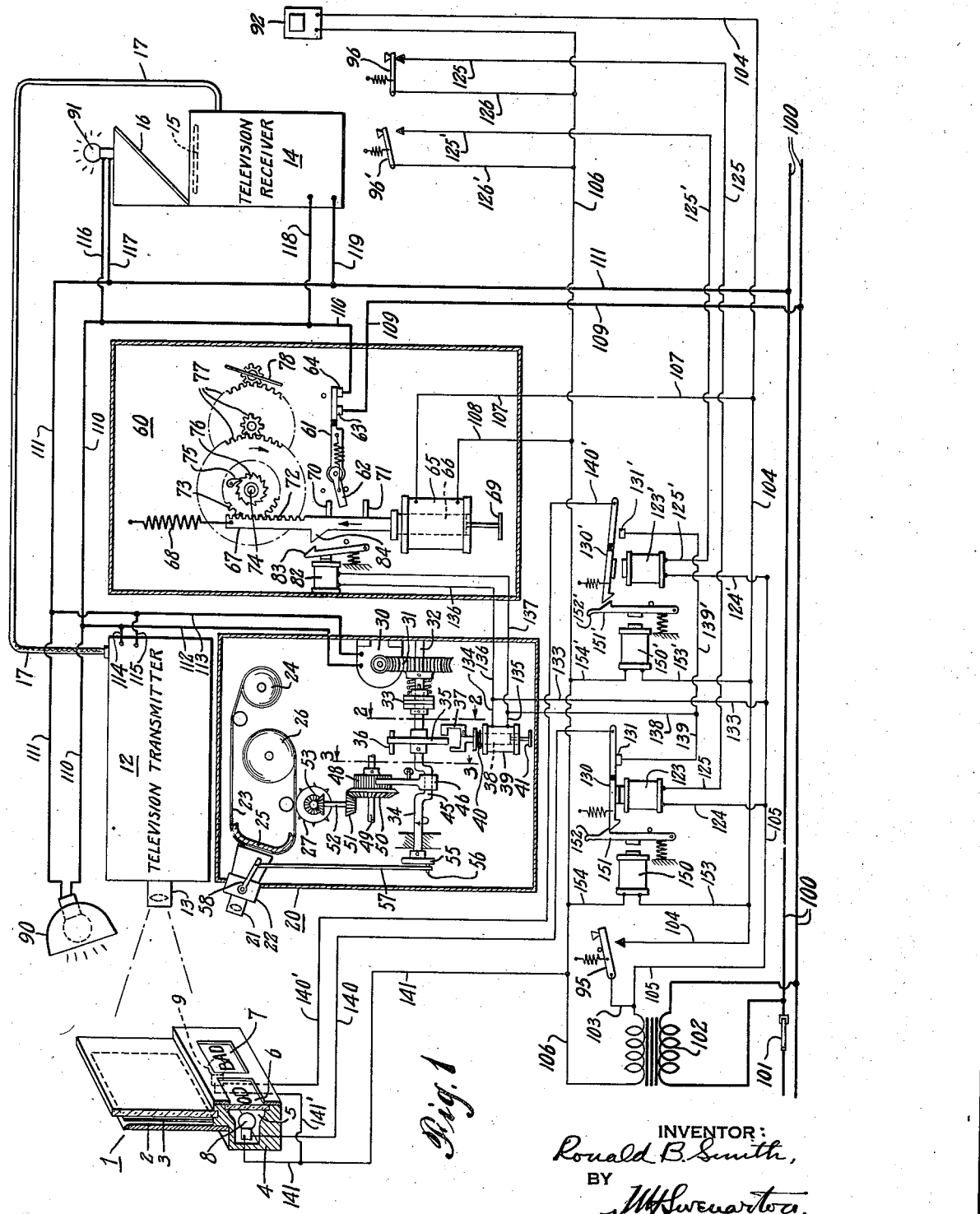
Figure 2:
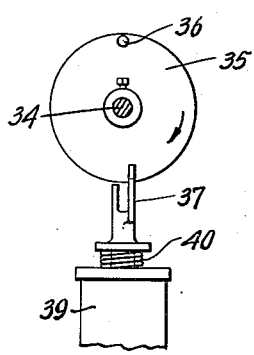
Figure 3:
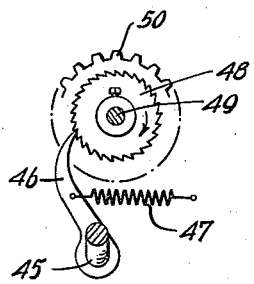

My invention is described in the following detailed specification and drawings forming a part thereof, in which latter Figure 1 is a schematic elevation of an apparatus embodying a preferred form of my invention;

Fig. 2 is an enlarged detail front elevation of the single revolution clutch element employed in such apparatus, isolated; and Fig. 3 is a detail front elevation of the ratchet device in the gear train of the film moving mechanism of the camera.

My invention possesses various advantages some of which are featured in the following description of the construction and operation of such preferred embodiment of an apparatus for the remote verification of checks, notes or similar documents. It is, of course, to be understood, however that my method may be performed in other apparatus than the preferred embodiment disclosed herein and that I do not limit myself to such apparatus, as various other embodiments thereof within the scope of the appended claims are also within the spirit of my invention. In order, however, that the broader aspects of my invention may be understood, I shall now proceed to describe such preferred embodiment.

Referring to the drawings and the construction shown therein, the reference numeral 1 designates a holder or rack having a slot 2 at the rear of a transparent front panel for the reception of a check 3, the image of which is to be electrically transmitted by television to a remote location for verification purposes. The base 4 of said rack has an illumination chamber 5 formed therein which is closed at the front by transparent windows 6 and 7 behind which are mounted electric light bulbs 8 and 9 respectively. The latter serve to illuminate stencils "good" and "bad" which are applied to the respective windows 6 and 7 so that, as hereinafter explained, the words of these stencils may be photographed simultaneously with the check under investigation.

The reference numeral 12 designates the television transmitter or so-called "pick-up," the same being of conventional construction and 13 the lens housing of such "pick-up" whereas the reference numeral 14 designates a television reproducer of the conventional construction and 15 the image reproduction screen or panel thereof. In the top of the television receiver, a mirror 16 is obliquely disposed, the same preferably extending upwardly from the rear of the screen 15 toward the front thereof, desirably at an angle of about 45° to the horizontal and serving to reflect to the bookkeeper or other observer an upright image of the inverted image received by the screen 15. A cable 17 serves to electrically hook-up the television transmitter and receiver in the well known manner.

The housing 20 encases an automatic recording camera and the controlling mechanism thereof, said camera preferably being of the type commonly used by commercial photographers for photographing documents. The camera lens 21 projects outside said housing and is controlled by a shutter 22 that is operatively connected with the controlling mechanism mounted within said housing. A sensitized strip of film 23, for example, the standard 16 mm. movie film, is mounted on a reel 24 and the same is threaded through a gate 25 and thence passes over the take-up reel 26, being supported at intermediate points by idler rolls in the customary manner. A sprocket wheel 27, the teeth of which engage marginal perforations on the film, serves to automatically feed the film step-by-step in consonance with the rotation of the associated gear train, hereinafter described.

An electric motor 30, acting through reduction gearing comprising a worm carried on its shaft, a cooperating worm gear 31 carried on an associated shaft 32 actuates, through friction drive 33, a crank shaft 34 on which is mounted a single revolution clutch plate 35. The latter has a pin 36 adjacent the periphery thereof that cooperates with a lug 37 carried by the armature 38 of the solenoid of the clutch control mechanism. Said armature is retracted while the electromagnet 39 is energized, in the manner hereinafter explained, and normally is held in its uppermost position as illustrated in Fig. 1 by the spring 40. The stroke of the armature 38 is adjusted by means of a knob 41.

The crank shaft 34 has a crank 45 on which is mounted a pawl 46 that is normally forced by a spring 47 into engagement with a ratchet 48, which is fixedly mounted on shaft 49 as is also a bevel crown gear 50. The latter gear meshes with a cooperating pinion 51 carried on the end of a pinion shaft 52 which also has a pinion 53 mounted on its opposite end that meshes with a cooperating bevel gear carried by shaft of the aforesaid driving sprocket 27 and rotatable with said sprocket so that when said pinion shaft is rotated the sprocket is correspondingly rotated.

A disc 55 is rigidly pinned to the end of the crank shaft 34, the same having an eccentrically disposed driving pin 56 positioned adjacent the periphery thereof and a link 57 is connected to said pin and to the shutter operating lever 58.

Adjacent the aforesaid housing 20, is mounted a housing 60 which contains the time switch or delaying shut-off mechanism, the same comprising a toggle switch contact arm 61 to which is pivoted a detent arm 62 that is elastically mounted so as to be snapped to an "on" position shown in Fig. 1 or an "off" position (not shown) according to whether the solenoid 65 is energized or not. The contact elements 63 and 64 of the switch are respectively connected into the circuits 109 and 110 and normally the flow of current across said contacts is interrupted since the toggle switch is then in an "off" position. An electro-magnet or solenoid 65 has its armature 66 extended to form a rack 67 and this is secured at its upper end to a tension spring 68 which normally serves to return the same to its uppermost position—the position shown in Fig. 1 being an intermediate one. An adjusting element or stop member 69 serves to regulate the position of the armature within the solenoid or coil as desired. Toggle detents 70 and 71, carried by said armature rod, serve to deflect the arm 62 of the toggle switch either up or down, for example when the armature 67 rises sufficiently to cause detent 71 to strike arm 62, due to the action of tension spring 68, the toggle switch will open, thus shutting off the television receiving and transmitting sets, the light 90, the motor 30 and the signal light 91.

The check 3 when positioned in the frame 1 is normally illuminated by the electric lamp 90. A separate monitor light 91 serves as a signal to indicate to the bookkeeper that the apparatus is energized. The buzzer 92, operated by the paying teller through the common push button control 95, serves to transmit an audible signal to the bookkeeper that a check is in position to be verified by the latter. Push button controls 96, 96' operated by the bookkeeper, serve to illuminate the light 8 and 9 behind the "good" stencil 6 and "bad" stencil 7, respectively.

The main circuit, which is designated by the reference numeral 100, desirably A. C. 110–120 volts circuit, is provided with a circuit breaker switch 101; and a primary or step-down transformer 102, interposed in this high voltage circuit, serves to supply low voltage current to the circuits represented by conductors 103, 104, 105, 106 and the branches thereof. Low voltage branch lines 107, 108 include in their circuit the solenoid 65 of toggle switch 61 which controls the high voltage branch lines 109, 110 that supply the television transmitting and receiving mechanism, motor 30 and lights 90 and 91. The other side of the high voltage supply line 100 is connected through the lead 111, to the lights 90, 91, motor 30, television transmitter 12 and receiver 14 and the toggle switch serves to control the circuit therethrough.

The various leads from the high voltage circuit to the various parts of the apparatus supplied thereby, are designated as follows, 112, 113 the motor leads; 114, 115 the television transmitter leads; 116 and 117 the leads of the bookkeeper's signal light; and 118, 119 the television receiver leads.

Solenoids 123, 123' are interposed in the low voltage circuits represented by the conductors 105, 124, 125, 126 and 106 and conductors 105, 124', 125', 126' and 106, which circuits are respectively controlled by the push buttons 96 and 96'.

The armatures 130 and 130' are elastically mounted and normally, if not locked by the cooperating detents, tend to assume an "off" position with respect to the associated contacts 131 and 131'.

The conductors 133 and 134 serve to connect one side of the coil of relay 39 to the low voltage line 105 while the conductors 135, 136 and 137 interconnect the coil of relay 82 in parallel with the circuit of the coil of relay 39 and with conductors 133 and 138, the latter being connected through wire 139 with contact 131 and through wire 139' with contact 131'. The contacts 131 and 131' when in engagement with their cooperating armatures 130 and 130' serve to close the circuits through the filament of one of the lamps 8 and 9 which are respectively interposed in low voltage circuits 140, 141 and 140' and 141' and which circuits are controlled by the bookkeeper by means of the said push buttons 96, 96'.

Upon consideration of Fig. 2, it will be observed that the double lug 37 on armature 38 has a short rear leg and a relatively long crooked or angular front leg and which legs are periodically interposed in the paths of the opposite ends of the pin 36 and thereby limit the periodic movements of the disc to one complete revolution each, all for the purposes hereinafter set forth.

The numerals 150, 150' designate the solenoids respectively controlling the said filament circuits of lamps 8 and 9 and the armatures 151, 151' of these solenoids have terminal finger pieces 152, 152' which permit of the manual release of such armatures by the teller after the desired information has been flashed by the bookkeeper, as hereinafter explained, on the panels 6 or 7. The coils on said solenoids 150, 150' are connected by conductors 153, 154 and 153', 154' in parallel into the low voltage circuit, comprising conductors 104, 106, switch 95, conductor 103 and the secondary coil of the transformer 102.

The operation of verifying a document in the above described apparatus is as follows:

The teller of a bank desiring to verify a check or promissory note, for example, through its bookkeeping department, inserts the document in rack 1 and presses the push button 95. Then, assuming the supply switch 101 is closed as is the case during the usual banking hours, the following sequence of operations occurs:

(1) Detent 151, constituting the armature of solenoid 150, will be instantly retracted toward the core of said solenoid since the circuit through the coil of the solenoid will have been closed by such depression of the push button, and thereby such detent 151 will be released from its normal engagement with the armature 130 of the "good" relay 123.

(2) The circuit through buzzer 92 having also been closed by the depression of said button 95, the said buzzer will audibly attract the attention of the bookkeeper.

(3) The circuit through the coil of the solenoid 65 will likewise be closed by such depression of the push button and the armature 67 thereof will be attracted toward the coil of the solenoid against the action of the spring 68, such movement of the armature throwing the toggle switch 61 into the closed position shown in Fig. 1, thereby bridging the gap between the terminals 63 and 64 and closing the circuit through the conductor 109, 110 and lamp 90. The latter circuit being energized, the lamp 90 will be lighted and will illuminate the check so mounted in said rack while at the same time the circuits of the television transmitter 12 and receiver 14 will be energized through the respective leads 114, 115 and 118, 119 from such circuit. Likewise such closing of the switch 61 energizes the circuit of the motor 30 through the circuit leads 112 and 113 and also effects the illumination of monitor lamp 91 in the bookkeeper's department through circuit leads 116 and 117. The armature 67 will be locked in a depressed or lowermost position by the detent 83 which automatically engages the tooth 84 as the latter passes beneath the shoulder of such detent and thereby all of the above circuits will continue to be energized so long as the toggle switch 61 remains closed even though the teller has released the push button 95. The television image of the check 3 will now be registered in the television receiver and can be studied by the bookkeeper by observing such image in the mirror 16, which is preferably hooded (not shown) to exclude extraneous light.

(4) After the bookkeeper has viewed the check, he first consults his ledger, statement or other records to ascertain whether the same is "good" or "bad" and then presses the appropriate button, viz, the button 96 for "good" and 96' for "bad." Assuming he depresses the button 96, then the circuit will be closed through the relay 130, as illustrated in Fig. 1, and the same will be held in a closed position by the detent 151 (since the circuit through the solenoid 150 will have been re-opened the moment the teller released the pressure on push button 95) due to the action of the spring which normally maintains such armature in an elevated position. The closing of the relay 130, also closes the circuit which includes the filament of the lamp 8 behind the "good" panel 6, the conductor 141, return conductor 140, armature 130, contact 131, conductor 139, conductor 138, the coil of the magnet 39 and the coil of detent release magnet 82 (which two latter solenoids are coupled in parallel) and conductors 133, 105.

(5) This action by the bookkeeper, as visibly recorded by the stencil "good" on the illuminated panel in front of the lamp 8 and which panel is located at a level immediately below the bottom of slot 2 so as to be within the field of focus of the camera, also initiates the operation of the single revolution clutch disc 35 since the short leg of bifurcated stop or leg 37 will be retracted out of the path of pin 36 and toward the coil 39 whose circuit will then have become energized, thus leaving such disc 35 and crank 45 free to be rotated by the motor through a single revolution and until the other end of pin 36 strikes the long angular arm of said stop 37. The first half of the rotation of shaft 34, causes eccentric pin 56 to pull lever 57 and attached lever 58 downward to the position shown, thus causing shutter 22 to record a picture of check 3 and "good" panel 6 on a frame of film 23 at gate 25. It may be noted that in Fig. 1 the disc 35 is shown in the position it assumes when such first half revolution of shaft 34 has been completed, the associated parts being in appropriate positions to admit of the completion of such single revolution of the disc. The film take-up reel 26 is driven by a reversing belt (not shown for clearness of illustration) reeved over the hub of sprocket wheel 27. Immediately after such photograph of the check and of the stencil of the particular panel so illuminated is completed, the crank 45, as it continues through the last half of its revolution, acting through the pawl 46, ratchet gear 48 and sprocket wheel 27 operatively geared thereto as aforesaid, causes a new frame of film to be moved into position through the gate 25. The teller, if he so desires, may extinguish lamp 8 by touching the finger release 152 on the armature 151 thereby opening the lamp circuit or else may wait until he has inserted another check in the holder; then as he touches the button 95 to signal for a report on another check, the detent 151 will be retracted out of engagement with the armature 130 and likewise open the lamp circuit.

(6) If the bookkeeper concludes to report the check as "bad," he presses button 96' which closes the circuit through the conductors 125', 124', 105 thereby energizing the relay 123' and closing the circuits through conductors 131', 140', 141' and lamp 9, whereby the stencil "bad" at the base of the check holders will be illuminated. Simultaneously the low voltage circuit through conductors 139', 138, the coil of solenoid 39 and detent release 82, hooked up in parallel therewith, will be closed and the current will return through conductors 136, 133 to the other side of the circuit 105. The solenoid 39 will control the operation of the single revolution clutch in the manner above described to permit of a photograph being made of the check under observation and of the illuminated stencil "bad" at the bottom of the holder and to automatically move a new frame of film through the gate 25.

(7) The aforesaid depression by the bookkeeper of the push button 96, not only effects the operation of the single revolution clutch for the purpose just explained but also energizes the circuit of the coil 82 and thereby retracts the detent 83 from engagement with the tooth 84 of rack 67. The latter thereupon, under the urge of spring 68, begins to rise against the resistance offered by the gears 73, 75, 76 and 77, constituting the delaying-gear train, whose gear ratios are so calculated as to permit an elapsed interval of time sufficient to admit of a reasonable waiting period between checks successively inserted by the teller in the viewing rack and verified before the lug 71 on rack 67 will be permitted to strike the arm 62 of the toggle switch and open the latter and the various circuits controlled thereby, including that of the television transmitter and receiver, the lamps 90 and 91 and the motor 30. The aforesaid action of the delaying-gear train insures against any unnecessary waste of current in the event the apparatus is not to be again immediately used after verifying but one or two checks. Such toggle switch, if open, will be instantly re-set in its closed position the moment the teller again depresses push button 95 preparatory to verifying another check in the manner aforesaid.

The position of the parts shown in Fig. 1, as previously stated, is an intermediate one, being that assumed after the solenoid 65 has been deenergized and during the gradual return, under the delaying action of the delaying-gear train of the rack 67, to its uppermost position under the influence of the spring 68.

My improved television system permits of the prompt verification of documents, such as a check for example, by the bookkeeping department of a bank or other institution to which a facsimile image of such check has been transmitted by television from the cage of the paying teller, all without any possible defacement or mutilation of the check while at the same time a permanent photographic record is made of the check with the associated fleeting "message" symbols displayed immediately adjacent the margin thereof. Furthermore, a series of checks can be verified in rapid succession and a separate photograph obtained of each check and the associated fleeting "message symbols" indicative of the separate reports made thereon by the bookkeeper. The apparatus is portable, simple and economical to operate, essentially fool-proof, compact and the original cost and upkeep expense is relatively small.

It is, of course, to be understood that the particular embodiment of my invention herein described is for the purpose of illustration and that my improved method may be performed in other apparatus and various modifications of the said preferred embodiment of the apparatus may be made, all without departing from the spirit of my invention as embraced within the scope of the appended claims.

Having thus described my invention, what I claim and desire to obtain by United States Letters Patent is:

1. In a television apparatus, the combination comprising a first station having a television pick-up thereat, supporting means for a document positioned at the first station within the field of view of said pick-up device, a second station remote from the first station, a television reproducing device located thereat, means for electrically interconnecting said television devices, signalling means associated with said document support, said signalling means having a panel normally ineffectual for conveying a desired message respecting the character of the document so televised in said apparatus as determined by a person at such second station and other means for rendering the signalling means effectual to indicate the character of such message.

2. In a television apparatus, the combination comprising a first station having a television pick-up thereat, supporting means for a document positioned within the field of view of said pick-up device, a second station remote from the first station, a television reproducing device located thereat, means for electrically interconnecting said television devices, indicator means associated with said document supporting means having a panel whereon pre-selected symbols are displayed which are normally ineffectual for conveying a message indicative of the character of such document as ascertained by a person at the second station, means operable from the second station for rendering said symbols effectual for conveying such a message and photographic means, including a shutter and means for automatically actuating the latter, for simultaneously photographing both said panel while it is illuminated and also a document positioned on the associated supporting means.

3. In a television apparatus for viewing documents, the combination comprising a first station having a television pick-up device associated therewith, a document support positioned within the field of view of such pick-up device, a second station having a television reproducing device positioned thereat, means for electrically interconnecting said television devices, indicator means at the first station, controllable from the second station for temporarily displaying an image constituting pre-selected symbols indicative of the character of such document as ascertained by a person at the second station and automatic means for simultaneously automatically photographing such document and such image while the latter is still visible.

4. In a television system for the verification of documents, the sub-combination comprising an automatic camera having a lens and shutter, a document support, indicator means having symbols thereon which are not photographically reproducible unless said panel is illuminated, said panel being positioned within the field of said lens and remote-controlled means for illuminating said panel and for automatically actuating said shutter.

5. In a television apparatus for the verification of a document from a location remote therefrom without permanent defacement or mutilation thereof, the combination comprising a first station having a televising device thereat, an associated document support having the area thereof which is adapted to receive the document to be televised in the field of vision of said televising device, a second station remote from the first station, a television reproducing device located thereat, means for electrically interconnecting such television devices, signalling means immediately associated with but not on said area and having one or more symbols, normally undisplayed, indicative of a message respecting the character of such document as determined by a person at such second station after inspection of a televised image of such document and means operatively controlled from the second station for displaying one or more of said symbols.

6. In a television apparatus for the verification of a document from a location remote therefrom without permanent defacement or mutilation thereof, the combination comprising a first station having a television televising device thereat, an associated document support having the area thereof which is adapted to receive the document to be televised in the field of vision of said televising device, a second station remote from the first station, a television reproducing device located thereat, means for electrically interconnecting such television devices, signalling means immediately associated with said area and having one or more symbols, normally ineffectual, indicative of a message respecting the character of such document as determined by a person at such second station after inspection of a televised image of such document, means operatively controlled from the second station for rendering the symbols on such signalling means effectual to indicate the character of such a message and automatic means for photographing the original document and such symbolic message associated therewith while the latter is still displayed.

7. In a television apparatus as claimed in claim 3, wherein such automatic means for simultaneously photographing the document and the temporarily displayed symbols includes a camera lens and shutter whose field of vision substantially includes the area of the document support to be occupied by a document and such symbols, a rotatable shaft, disengageable means for controlling the operation thereof, a strip of film, film-moving means for intermittently advancing such film and successively bringing portions thereof into a predetermined position with respect to said lens, means including a train of gears for interconnecting such shutter and such film-moving means and means interconnecting said shutter and shaft for periodically effecting the operation of the shutter at a predetermined moment during the rotation of the shaft.

8. In a television system for the remote verification of a document, the sub-combination comprising a first station, a televising device thereat, a document support having an area for the reception thereon of a document to be televised which area is within the field of vision of said televising device, a second station remote from the first station, a television reproducing device located thereat, means for electrically interconnecting such televising and television reproducing devices, means associated with said area of the document support and normally ineffectual which is adapted under certain conditions to indicate a message, transmitted by a person at the second station, respecting the character of a document mounted on said support and reproduced by television at such second station, as determined by said person at such second station; and means for rendering said last mentioned means effectual to indicate the character of such a message so transmitted from said second station.

RONALD B. SMITH.